United States Patent [19]

Miyoshi et al.

[11] Patent Number: 4,743,500
[45] Date of Patent: May 10, 1988

[54] MAGNETIC RECORDING MEDIUM

[75] Inventors: Takahito Miyoshi; Masaaki Fujiyama, both of Odawara, Japan

[73] Assignee: Fuji Photo Film Co., Ltd., Japan

[21] Appl. No.: 918,261

[22] Filed: Oct. 14, 1986

[30] Foreign Application Priority Data

Oct. 12, 1985 [JP] Japan .................. 60-227433

[51] Int. Cl.$^4$ .............................. G11B 5/708
[52] U.S. Cl. .................... 428/323; 428/328; 428/329; 428/694; 428/900
[58] Field of Search ........... 428/323, 694, 900; 427/128

[56] References Cited

U.S. PATENT DOCUMENTS

| | | | |
|---|---|---|---|
| 4,400,435 | 8/1983 | Yoda et al. | 428/694 |
| 4,455,345 | 6/1984 | Miyatuka et al. | 428/900 |
| 4,552,807 | 11/1985 | Yamada et al. | 428/694 |
| 4,613,545 | 9/1986 | Chubachi et al. | 428/694 |

*Primary Examiner*—Paul J. Thibodeau
*Attorney, Agent, or Firm*—Gerald J. Ferguson, Jr.; Michael P. Hoffman; Michael J. Foycik, Jr.

[57] ABSTRACT

A magnetic recording medium comprising a nonmagnetic support and a magnetic recording layer provided on said support, said magnetic recording layer comprising a ferromagnetic metal powder having a specific surface area of not less than 45 m$^2$/g and an inorganic powder having a Mohs' scale of hardness of not less than 5 which are dispersed in a binder, wherein 5-40 particles of said inorganic powder are arranged in the magnetic recording layer per (10 $\mu$m)$^2$ of the surface area of said recording layer in such manner that a portion of each inorganic particle is exposed on of the surface of the magnetic recording layer; and the average content of said inorganic powder in a portion of said recording layer within depth of 0.1 $\mu$m from the surface thereof is higher than that in other portion of the magnetic recording layer.

9 Claims, No Drawings

MAGNETIC RECORDING MEDIUM

BACKGROUND OF THE INVENTION

1. Field of the Invention

The present invention relates to a magnetic recording medium. More particularly, the invention relates to an improvement of a magnetic recording medium comprising a nonmagnetic support and a magnetic recording layer.

2. Description of Prior Arts

A magnetic recording medium (hereinafter referred to sometimes as a magnetic tape) such as an audio tape, a video tape, or a recording medium employed in a computer system, basically comprises a nonmagnetic support and a magnetic recording layer provided on the support. The magnetic recording layer comprises a ferromagnetic metal oxide powder such as a needle crystalline powder of $\gamma$-$Fe_2O_3$ or Co-containing $\gamma$-$Fe_2O_3$. Recently, a demand for a higher density recording system has increased, and hence a magnetic tape using a ferromagnetic metal powder has been employed in place of the conventional oxide-type ferromagnetic powder. Particularly, in an 8 mm-width type video system which has been recently employed in practice, a tape width of a video tape used therefor is narrower as compared with conventional VHS type or $\beta$ type video tapes, so that much higher density recording is desired for the tape. The 8 mm type video tape generally employs the ferromagnetic metal powder.

The ferromagnetic metal powder is high in a coercive force (Hc) and a residual flux density (Br). For this reason, the ferromagnetic metal powder is suitable for the high density recording system. However, the ferromagnetic metal powder inherently has a low hardness, and therefore a magnetic recording medium employing said powder is poor in the running endurance (or running property). That is, in the magnetic recording medium using the ferromagnetic metal powder, a magnetic recording layer is liable to be damaged on its surface, or the ferromagnetic metal powder is apt to drop off from the magnetic recording layer. Particularly in the case of the video tape, the magnetic recording layer shows only a short still life in the still mode in which a still video image is continuously reproduced.

It is known that an abrasive (i.e., hard particles) such as corundum, silicon carbide or chromium oxide can be incorporated into the magnetic recording layer to improve the running endurance of the magnetic recording medium using the ferromagnetic metal powder. However, for obtaining prominent effect of incorporation of the abrasive, the abrasive is required to be contained in the magnetic recording layer in a large amount. The increase of an amount of the abrasive contained in the magnetic recording layer eventually brings about decrease of the amount of the ferromagnetic metal powder incorporatable in the same layer. In other words, in the art of a magnetic recording medium conventionally employed, a magnetic recording medium is unavoidably decreased in the electromagnetic conversion characteristics in exchange for the improvement of the running endurance.

SUMMARY OF THE INVENTION

It is an object of the present invention to provide a novel magnetic recording medium.

It is another object of the invention to provide a magnetic recording medium which is excellent in both of the electromagnetic conversion characteristics and the running endurance.

There is provided by the present invention a magnetic recording medium comprising a nonmagnetic support and a magnetic recording layer provided on the support, said magnetic recording layer comprising a ferromagnetic metal powder having a specific surface area of not less than 45 $m^2/g$ and an inorganic powder having a Mohs' scale of hardness of not less than 5 which are dispersed in a binder, wherein 5–40 particles of said inorganic powder are arranged in the magnetic recording layer per (10 $\mu$m)$^2$ of the surface area of said recording layer in such manner that a portion of each inorganic particle is exposed on of the surface of the magnetic recording layer; and the average content of said inorganic powder in a portion of said recording layer within depth of 0.1 $\mu$m from the surface thereof is higher than that in other portion of the magnetic recording layer.

The present invention is based on the finding that only a portion of the abrasive contained in the magnetic recording layer, which resides on the surface of the magnetic recording layer, contributes to the improvement of the running endurance, and other portion thereof does not participate in the improvement of the running endurance. The magnetic recording medium of the invention is mainly characterized in that the abrasive is unevenly distributed in the magnetic recording layer, particularly distributed on the surface side of the magnetic recording layer, under the specific conditions.

The magnetic recording medium of the invention shows satisfactory electromagnetic conversion characteristics as well as high running endurance. That is, the present medium shows higher electromagnetic conversion characteristics as compared with a conventional medium when the running endurance of the recording medium of the invention is the same level as that of the conventional one, and shows higher running endurance as compared with a conventional medium when the electromagnetic conversion characteristic is the same level as that of the conventional one. Further, according to the present invention, both of the electromagnetic conversion characteristics and running endurance are well balanced to obtain a magnetic recording medium being more satisfactory in the both properties as compared with the conventional magnetic recording medium.

DETAILED DESCRIPTION OF THE INVENTION

A magnetic recording medium of the invention comprises a nonmagnetic support and a magnetic recording layer provided on the support. The magnetic recording layer comprises a ferromagnetic metal powder and an inorganic powder dispersed in a binder.

As a material of the nonmagnetic support, there can be employed those conventionally employed. Examples of the nonmagnetic support material include synthetic resin films such as films of polyethylene terephthalate, polyethylene, polypropylene, polycarbonate, polyethylene naphthalate, polyamide, polyamideimide, polyimide, polysulfone and polyether sulfone; and metallic foils such as aluminum foil and stainless steel foil. The thickness of the support generally is in the range of 3 to 50 $\mu$m, preferably in the range of 5 to 30 $\mu$m.

The nonmagnetic support may have a back layer (or backing layer) on the opposite side of the side where a magnetic recording layer is to be coated.

The magnetic recording medium of the invention has the above-described nonmagnetic support coated thereupon with a magnetic recording layer comprising a ferromagnetic metal powder dispersed in a binder, as described hereinbefore.

The ferromagnetic metal powder employable in the invention contains iron, cobalt or nickel, and has a specific surface area (S-BET) of not less than 45 m$^2$/g, preferably not less than 50 m$^2$/g. When the specific surface area of the ferromagnetic metal powder is less than 45 m$^2$/g, satisfactory electromagnetic conversion characteristics cannot be obtained in the resulting magnetic recording medium.

As a typical ferromagnetic metal powder, there can be mentioned a ferromagnetic alloy powder containing a metal component of at least 75 wt.% in which at least 80 wt.% of the metal component comprises at least one ferromagnetic metal or metal alloy (e.g., Fe, Co, Ni, Fe-Co, Fe-Ni, Co-Ni, Fe-Zn-Ni or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. Methods of the preparation of these ferromagnetic metal powders are already known, and the ferromagnetic metal powder employed in the invention can be prepared by the known methods.

There is no specific limitation on the shape of the ferromagnetic metal powder employable in the invention, but normally used is a ferromagnetic metal powder in a needle shape, grain shape, dice shape, rice shape or plate shape.

The binder material employable for the formation of the magnetic recording layer in the invention can be selected from those conventionally employed. Examples of the binder material include cellulose derivatives (e.g., nitrocellulose and cellulose acetate), vinyl chloride/vinyl acetate copolymer resins, (e.g., vinyl chloride/vinyl acetate copolymers, vinyl chloride/vinyl acetate/vinyl alcohol copolymers, and vinyl chloride/vinyl acetate/maleic anhydride copolymers), vinylidene chloride resins (e.g., vinylidene chloride/vinyl chloride copolymers and vinylidene chloride/acrylonitrile copolymers), polyester resins (e.g., alkyl resin and linear polyester), acrylic resins (e.g., acrylic acid/acrylonitrile copolymer and methyl acrylate/acrylonitrile copolymer), polyvinyl acetal resin, polyvinyl resin, phenoxy resin, epoxy resin, butadiene/acrylonitrile copolymer resin, polyurethane resin and urethane epoxy resin.

It is preferred to employ as the binder a combination of a resin having a high hardness such as a vinyl chloride/vinyl acetate/maleic anhydride copolymer and a resin having a low hardness such as a polyurethane resin, which is further added with a curing agent such as a polyisocyanate compound. The employment of such binder composition (i.e., cured composition) is very advantageous for enhancing the running endurance because it has a high hardness.

The binder is contained in the magnetic recording layer in the amount of 10–100 parts by weight, preferably 20–40 parts by weight, based on 100 parts by weight of the ferromagnetic metal powder.

The magnetic recording layer of the medium of the invention further contains an inorganic powder (i.e., abrasive) having a Mohs' scale of hardness of not less than 5.

There is no specific limitation on the inorganic powder provided that the inorganic powder has a Mohs' scale of hardness of not less than 5. Examples of the inorganic powder employable in the invention include $\alpha$-Al$_2$O$_3$ (a Mohs' scale of hardness: 9), TiO (the same: 6), TiO$_2$ (the same: 6.5), SiO$_2$ (the same: 7), SnO$_2$ (the same: 6.5), Cr$_2$O$_3$ (the same: 9), and $\alpha$-Fe$_2$O$_3$ (the same: 5.5).

The inorganic powder can be employed singly or in combination.

The average content of the inorganic powder in the whole magnetic recording layer is not more than 10 parts by weight per 100 parts by weight of the ferromagnetic metal powder.

In the magnetic recording medium of the present invention, it is necessary that 5–40 particles of the above-mentioned inorganic powder are arranged in the magnetic recording layer per (10 $\mu$m)$^2$ of the surface area of the magnetic recording layer in such a manner that a portion of each inorganic particle is exposed on the surface of the magnetic recording layer. The inorganic particle(s) arragned under such condition is sometimes referred to simply as "exposed particle(s)" hereinafter. The number of the exposed particles per (10 $\mu$m)$^2$ of the surface area of the magnetic recording layer is preferably in the range of 10–30. When the number of the exposed particles per (10 $\mu$m)$^2$ of the surface area of the magnetic recording layer is less than 5, the running endurance of the resulting medium is unsatisfactory. When the number of the exposed particles per (10 $\mu$m)$^2$ of the surface area of the magnetic recording layer is more than 40, the electromagnetic conversion characteristics are hardly improved, for instance, the reproduction output of a recorded signal having short wavelength decreases.

The above-described condition, namely, a condition in which the inorganic powder is fixed in such a manner that a portion of each particle is exposed outside of the surface of the magnetic recording layer, means that the inorganic powder is fixedly arranged in the magnetic recording layer not so as to readily drop off from the layer in such a manner that a portion of each particle of the inorganic powder is exposed outside of the surface of the recording layer to serve as an abrasive. Accordingly, it should be understood that inorganic particles under the following conditions cannot be employed in the invention. For instance, an inorganic particle is attached to the surface of the magnetic recording layer and almost wholly exposed outside of the layer so as to easily drop off from the layer by applying a slight external force thereonto. Otherwise, a very small portion of an inorganic particle is exposed on of the recording layer, so that the inorganic particle hardly functions as an abrasive.

In the recording medium of the invention, it is further required that the average content of the inorganic powder in a portion of said recording layer within depth of 0.1 $\mu$m from the surface thereof is higher than that in other portion of the magnetic recording layer.

The electromagnetic conversion characteristics can be highly improved by decreasing the average content of the inorganic powder in the deeper portion of the magnetic recording layer as described above. The reason is as follows. An inorganic powder contained in such deeper portion of the magnetic recording layer hardly serves as abrasive in the magnetic recording medium. According to the present invention, however, a portion of the inorganic powder not serving as abrasive can be replaced with a ferromagnetic metal powder, whereby the average content of the ferromagnetic metal powder in the whole magnetic recording layer can be increased.

In the present invention, preferred is a magnetic recording medium essentially not containing the inorganic powder in a portion of ½ of the magnetic recording layer in thickness from the surface of the support and containing almost all of the inorganic powder in the upper portion of the recording layer. Such favorable magnetic recording medium can be prepared, for instance, by a multiple-coating method (superposition coating method) which will be described hereinafter. The magnetic recording medium having the above-described structure is excellent in both of the electromagnetic conversion characteristics and the running endurance.

The exposed particles of the inorganic powder can be observed on the surface of the magnetic recording layer by the use of a scanning electron microscope, etc. at approx. 100,000 magnifications.

The mean particle diameter of the inorganic particle generally ranges from 0.1 to 1 μm.

The magnetic recording layer may further contain other additives conventionally employed in the preparation of a magnetic recording layer such as a lubricant, an antistatic agent, a filler, and a dispersing agent.

The magnetic recording medium of the present invention can be produced by a process comprising the steps of first preparing two kinds of magnetic paints (or dispersions), that is, a magnetic paint containing the inorganic powder and a magnetic paint containing no inorganic powder; then applying onto the nonmagnetic support the latter (magnetic paint containing no inorganic powder), upon which applying the former (magnetic paint containing the inorganic powder) by utilizing a multiple coating method.

The magnetic paint can be prepared by using the known methods. The above-mentioned ferromagnetic metal powder, binder, inorganic powder and other additives such as a filler if necessary are kneaded with a solvent to prepare a magnetic paint containing an inorganic powder. Those components except for the inorganic powder are likewise kneaded with a solvent to prepare a magnetic paint containing no inorganic powder. The binders used for those two magnetic paints are generally as the same as each other.

The solvent employable for kneading in the present invention can be selected from those conventionally used for the preparation of a magnetic paint. There is no specific limitation on the kneading method. The order of addition of each component can be appropriately selected.

The magnetic paint can be prepared using a conventional kneading apparatus such as a two-roll mill, a three-roll mill, a ball mill, a pebble mill, a thoron mill, a sand grinder, a Szegvari attritor, a high-speed impeller dispersing machine, a high-speed stone mill, a high-speed impact mill, a disper, a kneader, a high-speed mixer, a homogenizer and a ultrasonic dispersing machine.

The magnetic paints prepared as above are then subjected to a coating procedure.

The magnetic paint containing no inorganic powder is first coated on the surface of the nonmagnetic support, and then on thus coated magnetic paint is coated with the magnetic paint containing the inorganic powder. The thickness of the magnetic paint containing no inorganic powder preferably is larger than ½ of the thickness of the resulting magnetic recording layer, and the thickness of the the magnetic paint containing the inorganic powder preferably is not larger than ½ of the thickness of the resulting magnetic recording layer (preferably not larger than 1 μm).

Examples of the coating method employable in the invention include air doctor coating, blade coating, rod coating, extrusion coating, air knife coating, squeeze coating, impregnation coating, reverse roll coating, transfer roll coating, gravure coating, kiss coating, cast coating, spray coating and spin coating. Other methods can be also employed in the invention.

The whole thickness of the magnetic recording layer generally ranges from 0.2 to 10 μm, preferably from 0.5 to 7.0 μm, after dryness.

The magnetic paints coated as above are generally subjected to a magnetic orienting treatment for orienting the ferromagnetic metal powder, and dried to form a magnetic recording layer on the support. If desired, a surface smoothing treatment is further carried out. The magnetic recording medium having been subjected these treatments is subsequently cut to give a medium having a desired shape.

The magnetic recording medium of the present invention can be prepared by a method other than the above-described multiple coating method. For instance, a magnetic paint containing an inorganic powder is prepared in a conventional manner. Thus prepared magnetic paint is coated on the nonmagnetic support by a known method, and instantaneously a surface of the nonmagnetic support not coated with the magnetic paint (back surface of the support) is allowed a magnet to get close thereto so as to compulsively precipitate the ferromagnetic metal powder in the magnetic paint, whereby the inorganic powder (i.e., abrasive) is distributed mainly on the surface side of the resulting magnetic recording layer.

The magnetic recording medium of the invention shows high electromagnetic conversion characteristics, and is very advantageous particularly in the case that it is applied to an 8 mm type video tape. The 8 mm type video tape according to the invention shows remarkably high reproduction output. Moreover, this video tape shows an improved running endurance, and hence it shows a relatively long still life.

The examples and the comparison examples of the present invention are given below. In the following examples, the expression "parts" means "parts by weight", otherwise specified.

EXAMPLE 1

The components indicated below were kneaded for 48 hours in a ball mill to give a dispersion.

| | |
|---|---|
| Ferromagnetic metal alloy powder (Fe—Ni alloy, Ni: 5 wt. %, specific surface area (S—BET): 50 m$^2$/g) | 100 parts |
| Vinyl chloride/vinyl acetate/maleic anhydride copolymer (400 × 110 A available from Nippon Geon Co., Ltd., Japan, polymerization degree: 400) | 11 parts |
| Polyurethane resin (N-2301 available from Nippon | 2 parts |

-continued

| | |
|---|---|
| Polyurethane Co., Ltd., Japan) | |
| α-Fe$_2$O$_3$ (inorganic powder, mean particle size: 0.2 μm) | 10 parts |
| Carbon black (mean particle size: 40 mμ, available from Asahi Carbon Co., Ltd., Japan) | 2 parts |
| Oleic acid | 1 part |
| Stearic acid | 1 part |
| Butyl stearate | 1 part |
| Methyl ethyl ketone | 500 parts |

To the dispersion was added a curing agent containing 8 parts of polyisocyanate compound (Colonate L, trade name, available from Nippon Polyurethane Co., Ltd.) dissolved in 100 parts of methyl ethyl ketone, and the mixture was kneaded for one hour to give a dispersion. The dispersion was filtered using a filter having a mean pour size of 1 μm to prepare a magnetic paint containing an inorganic powder.

The above-described procedure was repeated except for not using the inorganic powder to prepare a magnetic paint containing no inorganic powder.

On a surface of a polyethylene terephthalate support (thickness: 10 μm) was coated the magnetic paint containing no inorganic powder to give a coated layer of thickness of 2.0 μm (thickness in dry state), on which was then coated the magnetic paint containing inorganic paint to give a coated layer of thickness of 1.0 μm (thickness in dry state), by using a reverse roll. The support having been coated with the magnetic paints was treated with an electromagnet at 3,000 gauss under wet condition to give a magnetic orientation. After the coated magnetic paints was dried, the layer was subjected to supercalendering. The resulting sheet was slitted to give a video tape (8 mm type video type) having a width of 8 mm.

The obtained video tape was examined with respect to reproduction output, still life and the number of exposed inorganic particles.

A signal of 5 MHz was input into the obtained video tape in a video tape recorder (FUJIX-8), and then the signal was reproduced from the video tape. A relative reproduction output of the video tape was measured by comparing a reproduction output given by a reference video tape (video tape prepared in Comparison Example 1) in which a video output of the reference tape recorded with a signal of the same 5 MHz was set to 0 dB.

Still life of the video tape was examined by continuously carrying out the reproduction procedure using the above-mentioned video tape and video recorder under a still mode. The examination was made to determine the term (i.e., still life) at the end of which one-third of the reproduced video image diminished.

The surface of the magnetic recording layer of the obtained video tape was observed by a scanning electron microscope at 100,000 magnifications, to examine the number of inorganic particles exposed outside of the surface of the magnetic recording layer per 10 μm$^2$ of the surface area.

The results are set forth in Table 1.

The reproduction output, still life and the number of exposed inorganic particles with respect to the video tapes prepared in the following examples and comparison examples were examined in the same manner as described above.

EXAMPLE 2

The procedure of Example 1 was repeated except for varying the amount of α-Fe$_2$O$_3$ in the magnetic paint containing inorganic powder to 20 parts to prepare an 8 mm type video tape.

The obtained video tape was examined with respect to reproduction output, still life, and the number of exposed inorganic particles. The results are set forth in Table 1.

EXAMPLE 3

The procedure of Example 1 was repeated except that 10 parts of α-Fe$_2$O$_3$ in the magnetic paint containing inorganic powder was replaced with 7.5 parts of α-Fe$_2$O$_3$ and 2.5 parts of α-Al$_2$O$_3$ (mean particle size: same as that of α-Fe$_2$O$_3$) to prepare an 8 mm type video tape.

The obtained video tape was examined with respect to reproduction output, still life, and the number of exposed inorganic particles. The results are set forth in Table 1.

COMPARISON EXAMPLE 1

The procedure of Example 1 was repeated except that only the magnetic paint containing inorganic powder was coated in such a manner that the resulting layer would have a thickness of 3 μm in dry state, to prepare an 8 mm type video tape.

The obtained video tape was examined with respect to reproduction output, still life, and the number of exposed inorganic particles. The results are set forth in Table 1.

COMPARSION EXAMPLE 2

The procedure of Example 1 was repeated except for varying the amount of α-Fe$_2$O$_3$ in the magnetic paint containing inorganic powder to 4 parts to prepare an 8 mm type video tape.

The obtained video tape was examined with respect to reproduction output, still life, and the number of exposed inorganic particles. The results are set forth in Table 1.

COMPARISON EXAMPLE 3

The procedure of Example 1 was repeated except for varying the amount of α-Fe$_2$O$_3$ in the magnetic paint containing inorganic powder to 45 parts to prepare an 8 mm type video tape.

The obtained video tape was examined with respect to reproduction output, still life, and the number of exposed inorganic particles. The results are set forth in Table 1.

COMPARISON EXAMPLE 4

The procedure of Example 1 was repeated except that the magnetic paint not containing inorganic paint was replaced with the magnetic paint containing inorganic powder prepared in Example 2 which contains 20 parts of α-Fe$_2$O$_3$, to prepare an 8 mm type video tape.

The obtained video tape was examined with respect to reproduction output, still life, and the number of exposed inorganic particles. The results are set forth in Table 1.

TABLE 1

|  | Exposed particle (per (10 μm)²) | Reproduction output (dB) | Still life |
| --- | --- | --- | --- |
| Example 1 | 10 | +6 | more than 60 min. |
| Example 2 | 20 | +5 | more than 60 min. |
| Example 3 | 10 | +5 | more than 60 min. |
| Com. Example 1 | 3 | 0 | 10 min. |
| Com. Example 2 | 4 | +5 | 10 min. |
| Com. Example 3 | 45 | −2 | more than 60 min. |
| Com. Example 4 | 10 | −3 | more than 60 min. |

Note: The term "more than 60 min." in still life shown in Table 1 means that two-third of the recorded video image remained even after a lapse of 60 min. under a still mode.

We claim:

1. A magnetic recording medium comprising a nonmagnetic support and a magnetic recording layer provided on said support, said magnetic recording layer comprising a ferromagnetic metal powder having a specific surface area of not less than 45 m²/g and an inorganic powder having a Mohs' scale of hardness of not less than 5 which are dispersed in a binder, wherein
   5-40 particles of said inorganic powder are arranged in the magnetic recording layer per (10 μm)² of the surface area of said recording layer in such manner that a portion of each inorganic particle is exposed on of the surface of the magnetic recording layer; and
   the average content of said inorganic powder in a portion of said recording layer within depth of 0.1 μm from the surface thereof is higher than that in other portion of the magnetic recording layer.

2. The magnetic recording medium as claimed in claim 1, wherein 10-30 particles of said inorganic powder are arranged in the magnetic recording layer per (10 μm)² of the surface area of the magnetic recording layer in such manner that a portion of each inorganic particle is exposed on the surface of the magnetic recording layer.

3. The magnetic recording medium as claimed in claim 1, wherein the average content of the inorganic powder within the whole magnetic recording layer is not more than 10 parts by weight based on 100 parts by weight of the ferromagnetic metal powder.

4. The magnetic recording medium as claimed in claim 1, wherein a portion of the bottom ½ of the magnetic recording layer in thickness from the surface of the support contains essentially no inorganic powder.

5. The magnetic recording medium as claimed in any claim of claims 1 to 4, wherein said inorganic powder is made of at least one compound selected from the group consisting of α-Al₂O₃, TiO, TiO₂, SiO₂, SnO₂, Cr₂O₃, and α-Fe₂O₃.

6. The magnetic recording medium as claimed in claim 1, wherein said magnetic recording layer contains one kind of said inorganic powders.

7. The magnetic recording medium as claimed in claim 1, wherein said magnetic recording layer contains two or more kinds of said inorganic powders.

8. The magnetic recording medium as claimed in claim 1, wherein the specific surface area of said ferromagnetic metal powder is not less than 50 m²/g.

9. The magnetic recording medium as claimed in claim 1, wherein said binder is composed of a cured composition consisting of a vinyl chloride/vinyl acetate/maleic anhydride copolymer, a polyurethane resin and a polyisocyanate compound.

* * * * *